United States Patent
Iizuka

(10) Patent No.: US 9,027,616 B2
(45) Date of Patent: May 12, 2015

(54) TIRE TUBE

(75) Inventor: Hiroshi Iizuka, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 131 days.

(21) Appl. No.: 12/989,462

(22) PCT Filed: Apr. 24, 2009

(86) PCT No.: PCT/JP2009/058179
§ 371 (c)(1),
(2), (4) Date: Oct. 25, 2010

(87) PCT Pub. No.: WO2009/133820
PCT Pub. Date: Nov. 5, 2009

(65) Prior Publication Data
US 2011/0041975 A1 Feb. 24, 2011

(30) Foreign Application Priority Data
Apr. 30, 2008 (JP) .................. 2008-119161

(51) Int. Cl.
| | |
|---|---|
| B60C 5/02 | (2006.01) |
| B32B 1/08 | (2006.01) |
| B32B 27/28 | (2006.01) |
| B60C 5/04 | (2006.01) |
| B60C 5/08 | (2006.01) |
| B60C 17/01 | (2006.01) |
| B32B 23/08 | (2006.01) |

(52) U.S. Cl.
CPC .............. B60C 5/04 (2013.01); *B32B 2274/00* (2013.01); *B32B 23/08* (2013.01); B32B 1/08 (2013.01); B60C 5/08 (2013.01); B60C 17/01 (2013.01)

(58) Field of Classification Search
CPC ............ B60C 5/02; B32B 1/08; B32B 27/00; B32B 27/28; B32B 23/08; B32B 2274/00
See application file for complete search history.

(56) References Cited

U.S. PATENT DOCUMENTS

| | | | | | |
|---|---|---|---|---|---|
| 4,279,284 | A | * | 7/1981 | Spadone | 152/511 |
| 4,779,657 | A | * | 10/1988 | Cheung et al. | 152/510 |
| 5,040,583 | A | * | 8/1991 | Lin et al. | 152/510 |

(Continued)

FOREIGN PATENT DOCUMENTS

| | | | |
|---|---|---|---|
| GB | 336076 | * | 10/1930 |
| GB | 879571 | * | 10/1961 |

(Continued)

*Primary Examiner* — Justin Fischer
(74) *Attorney, Agent, or Firm* — Carrier Blackman & Associates, P.C.; Joseph P. Carrier; William D. Blackman

(57) ABSTRACT

An object of the invention is to provide a tire tube which has excellent air impermeability and such excellent durability that the occurrence of cracks in the tube main body is prevented in a contact surface between the tube main body and an inner circumferential surface of the tire. The tire tube of the invention includes a tube main body having a multilayer structure in which at least one rubber layer and at least one thermoplastic resin layer made of a thermoplastic resin or a thermoplastic elastomer composition obtained by blending an elastomer in a thermoplastic resin are laminated together. In at least a region where the tube main body is in contact with the inner circumferential surface of the tire tread part, the rubber layer is placed as the outermost layer of the multilayer structure, and the thermoplastic resin layer is placed inside the outermost layer.

13 Claims, 4 Drawing Sheets

(56) References Cited

U.S. PATENT DOCUMENTS

| | | | |
|---|---|---|---|
| 5,271,977 A | * | 12/1993 | Yoshikawa et al. .......... 428/35.9 |
| 5,785,779 A | * | 7/1998 | McGee et al. ................ 152/204 |
| 8,122,927 B2 | * | 2/2012 | Sinyard et al. ................ 152/429 |
| 2005/0090616 A1 | | 4/2005 | Dias et al. |

FOREIGN PATENT DOCUMENTS

| | | | |
|---|---|---|---|
| JP | 26-6202 Y1 | | 6/1951 |
| JP | 62-253428 | * | 11/1987 |
| JP | 63-077740 A | | 4/1988 |
| JP | 1-178001 A | | 7/1989 |
| JP | 5-193305 A | | 8/1993 |
| JP | 2005-067316 A | | 3/2005 |
| JP | 62-253428 A | | 11/2005 |
| JP | 2007509778 A | | 4/2007 |

* cited by examiner

TIRE TUBE

TECHNICAL FIELD

The present invention relates to a tire tube, more specifically to a tire tube whose durability and air impermeability are excellent.

BACKGROUND ART

In a case of a tube-type pneumatic tire used for trucks, buses and the like, air impermeability of a tube has a large influence on the durability of the tire. Specifically, a tube having higher air impermeability exercises a positive influence on the durability of the tire.

Increasing the thickness of rubber of the tube is one of conceivable methods for imparting high air impermeability to the tube. However, increasing the thickness of the rubber of the tube increases an amount of rubber used for the tube, and thus increases the weight of the tire, and also causes increase in heat produced during running. The increase in the weight of the tire brings about a problem of increase in rolling resistance which causes higher fuel consumption. In addition, the increase in heat produced in the tube brings about a problem of deterioration of the durability of the tire.

On the other hand, thermoplastic resin has a characteristic that air impermeability thereof is better than that of rubber, although the elastic modulus thereof is larger than that of the rubber. Considering this, there comes an idea of forming the thermoplastic resin into a tire tube with a small thickness which is in inverse proportion to the elastic modulus. However, a tire tube made of the thermoplastic resin has a higher elastic modulus than that of the rubber, and a small thickness. For this reason, the tire tube made of the thermoplastic resin is highly likely to suffer cracks in its surface due to bending fatigue caused by contact with the inner circumferential surface of the tire. This may eventually lead to a puncture of the tube main body. Cracks in the tube main body are more likely to occur in a region where an uneven portion of a splice part of the tube main body is in contact with the inner circumferential surface of the tire tread part.

The following three cases are given as general generating mechanism of the occurrence of cracks in a tube made of such a thermoplastic resin. Prevention of the occurrence of cracks due to these cases has a direct relationship with the durability of the tube.

(1) Occurrence of cracks in the tube main body in a contact surface between the tube main body and the tire.
(2) Occurrence of cracks in the splice part of the two end portions of the tube main body.
(3) Occurrence of cracks in the joint section between the valve seat of the air injection valve and the tube main body.

On the other hand, as a proposal for improvement in the durability of the tube main body, Patent Document 1 has disclosed a rubber tire tube having a two-layer structure in which a first rubber layer and a second rubber layer are closely laminated together. The first rubber layer is made of 100 weight percent of butyl rubber, and the second rubber layer contains not less than 70 weight percent but not more than 100 weight percent of butyl rubber. In addition, the permanent tension set of the second rubber layer is set not less than 0.50 times but not more than 0.95 times as large as that of the first rubber layer.

In addition, as a tire tube whose durability is enhanced by alleviating its degradation with time during storage, Patent Document 2 has proposed a tire tube having a two-layer structure which includes: a main body layer formed of an elastic material; and a reinforcement layer formed of an elastic material different from the elastic material of the main body layer. The elastic material of the main body layer is a butyl-based rubber, and the elastic material of the reinforcement layer is a NR-SBR-BR-based rubber.

However, the tire tubes disclosed in Patent Documents 1 and 2 are still insufficient from a viewpoint of the improvement in the durability and air impermeability of the tube main body.

Furthermore, Patent Document 3 has proposed a tire inner tube including an air barrier layer of a laminated body which includes at least 25 layers of micro-layer composites each containing an elastomer blend and a thermoplastic resin with a high barrier property. In the case of this tube disclosed in Patent Document 3, however, the problem of enhancing the durability of the tube main body remains yet to be solved, although the air impermeability is enhanced.

PRIOR ART DOCUMENT

Patent Documents

Patent Document 1: Japanese patent application Kokai publication No. Hei. 5-193305
Patent Document 2: Japanese patent application Kokai publication No. 2005-67316
Patent Document 3: Japanese Patent Translation Publication No. 2007-509778

SUMMARY OF THE INVENTION

Problem to be Solved by the Invention

With the above-discussed points taken into consideration, a primary object of the present invention is to provide a tire tube having excellent air impermeability and such excellent durability that the occurrence of cracks in the tube main body is prevented in a contact surface between the tube main body and an inner circumferential surface of the tire.

A secondary object of the present invention is to provide the tire tube having excellent air impermeability and such excellent durability that the occurrence of cracks in the tube main body can be prevented in a joint section between a valve seat of an air injection valve and the tube main body.

Another secondary object of the present invention is to provide the tire tube having excellent air impermeability and such excellent durability that the occurrence of cracks in the tube main body is prevented in a splice part of end portions of the tube main body.

Means for Solving the Problem

A tire tube for achieving the above-described object of the invention has the following configuration of (1).

(1) In the tire tube, a tube main body has a multilayer structure in which at least one rubber layer and at least one thermoplastic resin layer are laminated together, the thermoplastic resin layer made of any one of a thermoplastic resin and a thermoplastic elastomer composition obtained by blending an elastomer in a thermoplastic resin, the rubber layer is placed as an outermost layer of the multilayer structure in at least a region where the tube main body is in contact with an inner circumferential surface of a tire tread part, and the thermoplastic resin layer is placed inside the outermost layer.

The tire tube of the present invention more preferably has anyone of the configurations described below in (2) to (11).

(2) In the tire tube described above in (1), in a transverse cross section of the tube main body, the rubber layer and the thermoplastic resin layer are each formed in the shape of a ring continuing in a circumferential direction.

(3) In the tire tube described above in (1) or (2), the multilayer structure includes at least three layers in which the rubber layers are respectively superposed on inner and outer sides of the thermoplastic resin layer.

(4) In the tire tube described above in (1), (2), or (3), a thickness of the rubber layer as the outermost layer is set not less than 0.5 mm but not more than 2 mm in a portion thereof which corresponds to a region extending in a tire width direction between two outermost circumferential-direction grooves in the tire tread part when the tire tube is set in a tire.

(5) In the tire tube described above in any one of (1), to (4), the rubber layer is made of a rubber composition in which at least butyl rubber is blended.

(6) In the tire tube described above in any one of (1), to (5), the tire tube has a multilayer structure with three or more layers, in which at least two layers each of which is the rubber layer and at least one layer which is the thermoplastic resin layer are laminated together.

(7) In the tire tube described above in any one of (1), to (6), an air injection valve is attached to a valve seat adhered to an external surface of the tube main body with a metal valve seat fitting in between, and the valve seat is made of any one of a thermoplastic resin and a thermoplastic elastomer composition obtained by blending an elastomer in a thermoplastic resin.

(8) In the tire tube described above in (7), a thickness of the valve seat is 0.1 times or more as thick as that of the metal valve seat fitting.

(9) In the tire tube described above in (7) or (8), a protective cover made of any one of a thermoplastic resin and a thermoplastic elastomer composition obtained by blending an elastomer in a thermoplastic resin is adhered to a joint section between the tube main body and the valve seat to cover the joint section in a way that the protective cover stretches over surfaces respectively of the tube main body and the valve seat.

(10) In the tire tube described above in any one of (1), to (9), a protective cover made of any one of a thermoplastic resin and a thermoplastic elastomer composition obtained by blending an elastomer in a thermoplastic resin is adhered to an outer peripheral portion of a splice part, where two end portions of the tire tube are overlappingly joined together, to cover the splice part in a way that the protective cover stretches over surfaces of the respective two end portions.

(11) In the tire tube described above in (10), the protective cover is a belt-shaped body with a width of 5 mm to 10 mm and a thickness of not more than 0.5 mm.

Effects of the Invention

In the tire tube according to the present invention, the tube main body has the multilayer structure including the rubber layer and the thermoplastic resin layer; the rubber layer is placed as the outermost layer of the multilayer structure; and the thermoplastic resin layer is placed inside the outermost layer. Thus, the occurrence of cracks in the front surface of the tube main body can be prevented in the contact surface between the tube main body and the tire, and excellent air impermeability based on the thermoplastic resin layer placed inside the outermost layer can be ensured.

Furthermore, the splice part and the valve seat of the tube main body may be covered with protective covers made of the thermoplastic resin or the thermoplastic elastomer composition obtained by blending an elastomer in a thermoplastic resin. By doing so, occurrence of cracks in the splice part and the valve seat can be prevented and higher durability and air impermeability can be achieved in addition to the above-described high durability of the tube main body.

BEST MODES FOR CARRYING OUT THE INVENTION

Hereinafter, more detailed descriptions will be provided for the tire tube according to the present invention.

Figure 1:
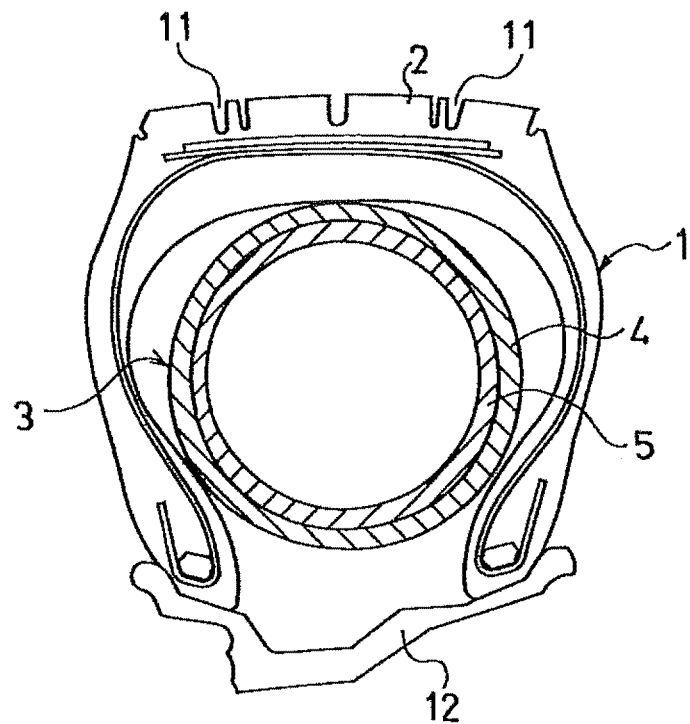
FIG. 1 is a tire-meridian cross-sectional schematic view showing a pneumatic tire, in which a tire tube according to an embodiment of the present invention is inserted, as a model.

In FIG. 1, reference numeral 1 denotes a heavy-duty pneumatic tire mounted on a rim 12, and reference numeral 3 denotes a tire tube of the present invention. Multiple circumferential-direction grooves 11 are made in a tread part 2 of the pneumatic tire 1. A tube main body of the tire tube 3 is made by: placing a ring-shaped rubber layer 4 in an outer side in a thickness direction in a transverse cross section of the tire tube 3; and superposing a ring-shaped thermoplastic resin layer 5 on an inner side of the ring-shaped rubber layer 4. In this respect, the thermoplastic resin layer 5 may be made solely of a thermoplastic resin or of a thermoplastic elastomer composition obtained by blending an elastomer in a thermoplastic resin. The structure of the tube main body is not limited to the structure which includes the two layers as shown by the illustrated example. The only requirement for the structure of the tube main body is that the tube main body has a multilayer structure which is formed by laminating at least two layers consisting of at least one rubber layer 4 and at least one thermoplastic resin layer 5. In such multilayer structure, the rubber layer 4 is placed as the outermost layer in at least a region where the tube main body is in contact with an inner circumferential surface of the pneumatic tire corresponding to the tire tread part, and the thermoplastic resin layer 5 is placed inside the outermost layer.

The tire tube 3 according to the present invention is capable of having an excellent air impermeability based on the thermoplastic resin, because the inner layer of the tire tube main body having the multilayer structure is formed from the thermoplastic resin layer 5. In addition, in the tire tube 3 according to the present invention, at least the outermost layer in contact with the inner circumferential surface of the tire tread part is made of the rubber layer 4. This allows the shock absorbing function and wear resistance of the rubber layer to protect the thermoplastic resin layer 5 in the contact surface between the tube main body and the tire. Accordingly, the top surface of the tube main body is prevented from cracking.

In the present invention, the tire tube having the multilayer structure including at least one thermoplastic resin layer and at least one rubber layer may have any one of tube main body cross sections illustrated in the respective embodiments shown in FIGS. 2 to 5, in addition to the two-layer structure in the embodiment of FIG. 1.

Figure 2:
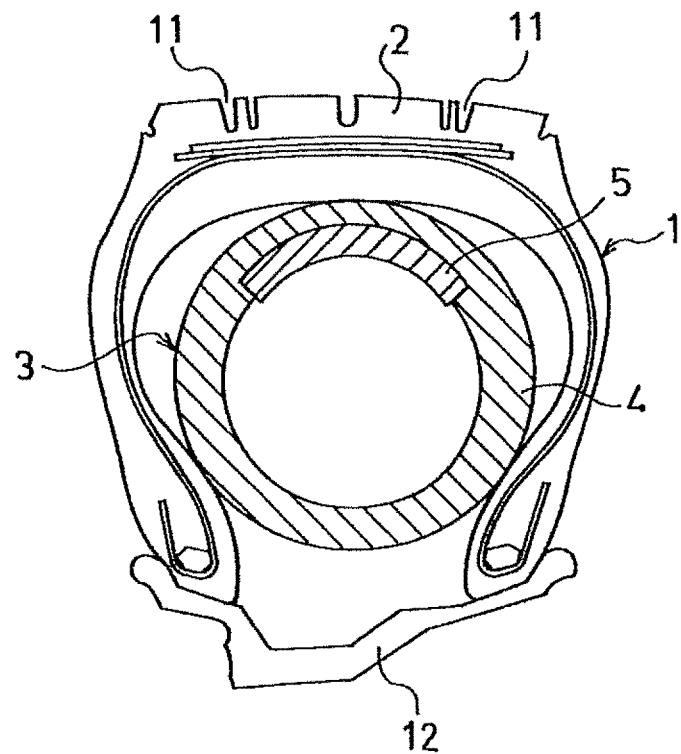
FIG. 2 is a tire-meridian cross-sectional schematic view showing a pneumatic tire, in which a tire tube according to another embodiment of the present invention is inserted, as a model.

The tire tube 3 shown in FIG. 2 has the following structure. The entire tube main body is formed of the ring-shaped rubber layer 4, and the thermoplastic resin layer 5 is superposed on the inner circumferential surface of the ring-shaped rubber layer 4 only in a region where the tube main body comes in contact with the inner periphery of the tread part 2 of the pneumatic tire 1. The tire tube 3 shown in FIG. 3 has a lamination structure opposite of that shown in FIG. 2. Specifically, the entire tube main body is formed of the ring-shaped thermoplastic resin layer 5, and the rubber layer 4 is superposed on the outer circumferential surface of the ring-shaped thermoplastic resin layer 5 only in a region where the tube main body is in contact with the inner periphery of the tread part 2 of the pneumatic tire 1.

Figure 4:
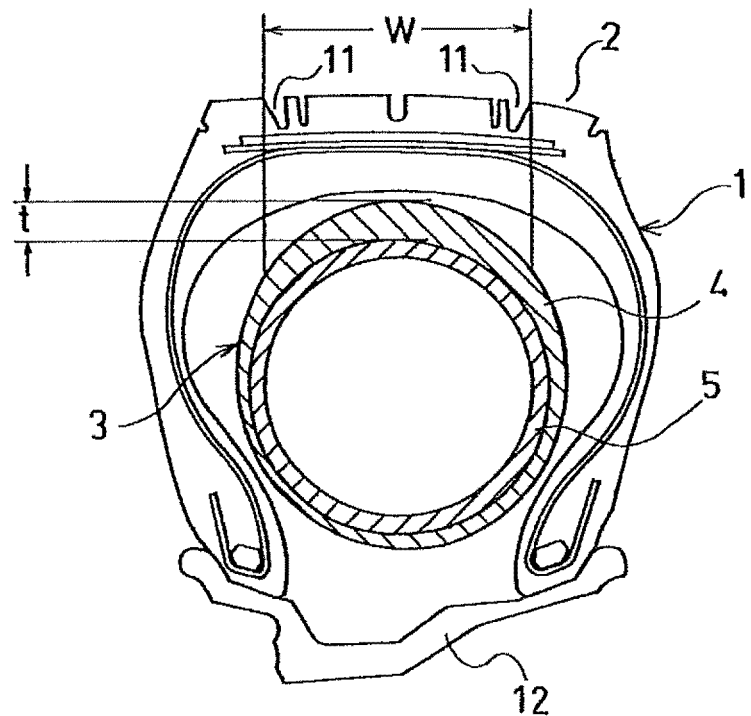
FIG. 4 is a tire-meridian cross-sectional schematic view showing a pneumatic tire, in which a tire tube according to still another embodiment of the present invention is inserted, as a model.

Like the tire tube 3 shown in FIG. 1, the tire tube 3 shown in FIG. 4 has a lamination structure of two layers in which: the ring-shaped thermoplastic resin layer 5 is placed as the inner layer of the tube main body; and the ring-shaped rubber layer 4 is placed as the outer layer of the tube main body. However, the thickness of the rubber layer 4 being the outer layer changes in the circumferential direction such that the thickness of the rubber layer 4 becomes larger toward a region where the rubber layer 4 is in contact with the inner periphery of the tread part 2.

Figure 5:
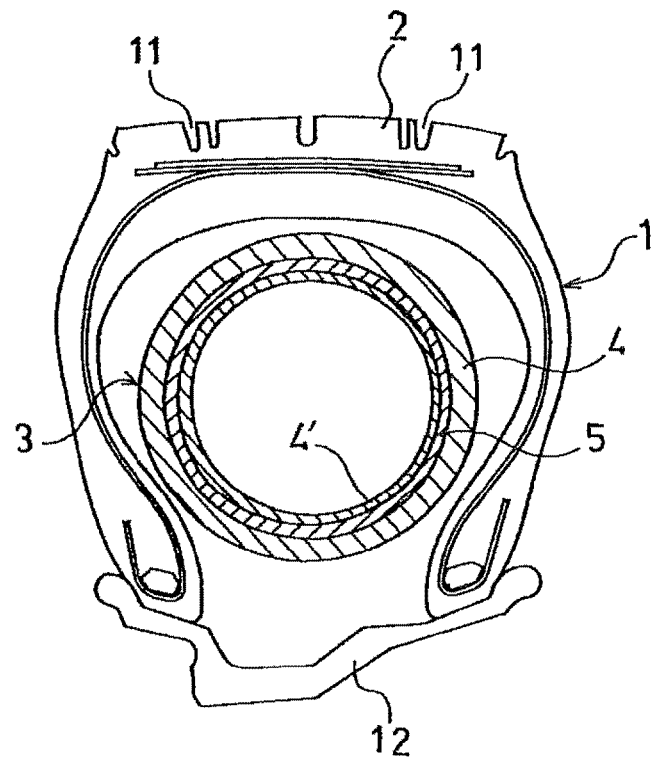
FIG. 5 is a tire-meridian cross-sectional schematic view showing a pneumatic tire, in which a tire tube according to still yet another embodiment of the present invention is inserted, as a model.

The tire tube shown in FIG. 5 has a lamination structure of three layers in which: the ring-shaped thermoplastic resin layer 5 is an intermediary layer; and the ring-shaped rubber layer 4 and a ring-shaped rubber layer 4' are superposed respectively on the outer side and inner side of the thermoplastic resin layer 5 in a manner adjacent to each other. The thicknesses of the respective three layers are set in away that: the rubber layer 4 as the outermost layer is the largest; the thermoplastic resin layer 5 as the intermediary layer is thinner than the rubber layer 4; and the rubber layer 4' as the innermost layer is thinner than the thermoplastic resin layer 5.

The durability is enhanced more in the tube according to the embodiment shown by FIG. 5, which has the structure including: the thermoplastic resin layer 5 as the intermediary layer; and the rubber layers 4, 4' respectively superposed on the outer and inner sides of the thermoplastic resin layer 5.

In a case where the multilayer structure includes four or more layers, the innermost layer may be formed of the rubber layer or the thermoplastic resin layer. It is desirable that the innermost layer should be formed of the rubber layer.

In the present invention, a rubber composition in which butyl rubber is blended as the main component is desirably used as a rubber component used for the rubber layer. Because butyl rubber has higher air impermeability than other rubber components, butyl rubber can impart the high air-impermeable to the tire tube in addition to shock absorbing properties and bending fatigue resistance.

In the present invention, examples of the thermoplastic resin preferably used to make the tube include: polyamide-based resins [for instance, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon Jun. 66, 19610 copolymers (N6/66/610), nylon MXD6 (MXD6), nylon 6T, nylon 6/6T copolymers, nylon 66/PP copolymers, and nylon 66/PPS copolymers], and their N-alkoxyalkylates [for instance, methoxymethylated nylon 6, methoxymethylated nylon 6/610 copolymers, and methoxymethylated nylon 612]; polyester-based resins [for instance, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for instance, polyacrylonitirile (PAN), polymethacrylonitrile, acrylonitrile/styrene copolymers (AS), (meth)acrylonitrile/styrene copolymers, (meth)acrylonitrile/styrene/butadiene copolymers]; polymethacrylate-based resins [for instance, polymethyl methacrylate (PMMA), polyethylmethacrylate]; polyvinyl-based resins [for instance, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers (ETFE)]; cellulose-based resins [for instance, cellulose acetate, and cellulose acetate butyrate]; fluororesins [for instance, polyvinylidene fluoride (PVDF), polyvinyl fluoride (PVF), polychlorotrifluoroethylene (PCTFE), tetrafluoroethylene/ethylene copolymers]; imide-based resins [for instance, aromatic polyimide (PI)]; and the like.

In addition, the thermoplastic elastomer composition used to make the tube may be made by blending an elastomer in a thermoplastic resin. In this respect, the thermoplastic resin used may be similarly selected from the above-mentioned resin group.

Examples of the elastomer include: diene rubbers and their hydrogenated products [for instance, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR]; olefin-based rubbers [for instance, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers]; halogen-containing rubbers [for instance, Br-IIR, Cl-IIR, brominated isobutylene para-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for instance, methyl vinyl silicone rubber, dimethyl silicone rubber, methylphenylvinyl silicone rubber]; sulfur-containing rubbers [for instance, polysulfide rubber]; fluororubbers [for instance, vinylidene fluoride-based rubbers, fluorine-containing vinyl ether-based rubbers, tetrafluoroethylene propylene-based rubbers, fluorine-containing silicone-based rubbers, fluorine-containing phosphazene-based rubbers]; thermoplastic elastomers [for instance, styrene-based elastomers, olefin-based elastomers, ester-based elastomers, urethane-based elastomers, and polyamide-based elastomers]; and the like.

If a specific one of the above-mentioned thermoplastic resins is incompatible with a specific one of the above-mentioned elastomers, the thermoplastic resin and the elastomer may be made compatible with each other by using an appropriate compatibilizer as a third component. The interfacial tension between the thermoplastic resin and the elastomer decreases when such a compatibilizer is mixed in the blend system of the thermoplastic resin and the elastomer. As a result, the size of rubber particles constituting the dispersion phase becomes finer, and these two components accordingly can exhibit their characteristics more effectively. In general, such a compatibilizer may have: a copolymer structure including both or either of a structure of the thermoplastic resin and a structure of the elastomer; or a copolymer structure including an epoxy group, a carbonyl group, a halogen group, an amino group, an oxazoline group, a hydroxyl group or the like, which is capable of reacting with the thermoplastic resin or the elastomer. Such a compatibilizer may be selected depending on the types respectively of the thermoplastic resin and the elastomer with which the compatibilizer is mixed. Examples of the compatibilizer normally used include: styrene/ethylene-butylene block copolymers (SEBS) and their maleic acid-modified products; EPDM; EPM; EPDM/styrene or EPDM/acrylonitrile graft copolymers, and their maleic acid-modified products; styrene/maleic acid copolymers; reactive phenoxine; and the like. No specific restriction is imposed on the blending proportion of such a compatibilizer. It is desirable that the blending proportion of such a compatibilizer should be 0.5 to 10 parts by weight per 100 parts by weight of the polymer components (the total amount of the thermoplastic resin and the elastomer).

No specific restriction is imposed on the component ratio of the specific thermoplastic resin to the specific elastomer in the thermoplastic elastomer composition. This component ratio may be set as appropriate in order that the elastomer is dispersed as a discontinuous phase in the matrix of the thermoplastic resin. It is desirable that this component ratio of the thermoplastic resin and the elastomer should be in a range of 90/10 to 30/70 in weight ratio.

In the present invention, the thermoplastic resin and the thermoplastic elastomer composition used to make the tube may be mixed with other polymers, for instance, the above-mentioned compatibilizer and the like, as long as the other polymers do not damage the characteristics needed for the tube. The purposes of mixing such other polymers are to improve the compatibility between the thermoplastic resin and the elastomer, to improve the molding processability of the material, to improve the heat resistance, to reduce costs, and so on. Examples of materials used for these purposes include polyethylene (PE), polypropylene (PP), polystyrene (PS), ABS, SBS, polycarbonate (PC), and the like. In addition, a filler (calcium carbonate, titanium oxide, alumina or the like) generally blended in the polymer blend, a reinforcing agent such as carbon black and white carbon, a softener, a plasticizer, a processing aid, a pigment, a dye, an antioxidant, and the like may be blended optionally as long as the blended materials do not impair the characteristics needed for the tube.

No specific restriction is imposed on the Young's modulus of the thermoplastic resin and the thermoplastic elastomer composition, which are used for the present invention, in the standard atmosphere specified by JIS K7100. The Young's modulus thereof is set desirably in a range of 1 MPa to 500 MPa, more desirably, in a range of 50 MPa to 500 MPa.

Figure 3:
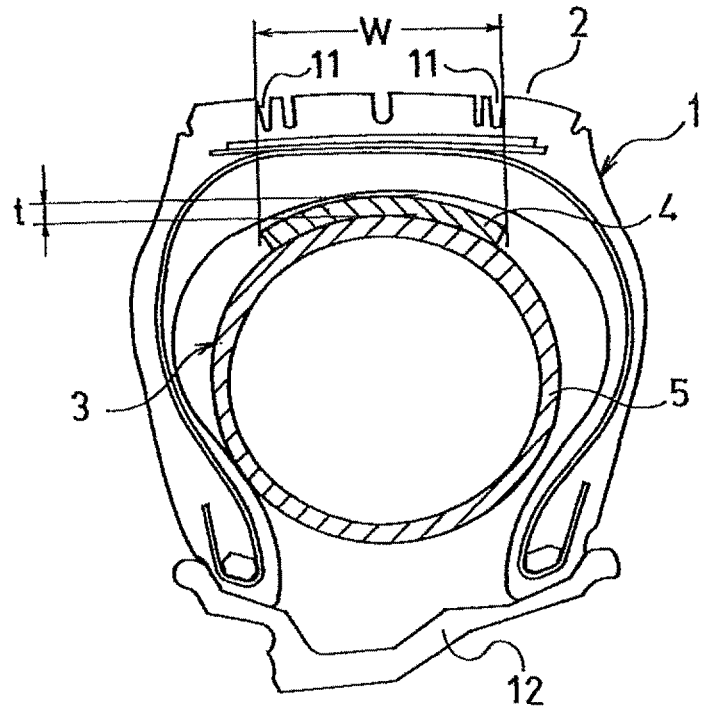
FIG. 3 is a tire-meridian cross-sectional schematic view showing a pneumatic tire, in which a tire tube according to yet another embodiment of the present invention is inserted, as a model.

In the tire tube according to the present invention, it is desirable that the thickness of the rubber layer in at least the region where the tire tube is in contact with the inner circumferential surface of the tire tread part should securely have a certain thickness. Specifically, as shown in FIGS. 3 and 4, in the area in which the tube main body is in contact with the inner circumferential surface of the tire tread part 2, the thickness t of the rubber layer 4 as the outermost layer is set not less than 0.5 mm but not more than 2 mm in a portion corresponding to a region W which is a region between the two outermost circumferential-direction grooves 11 out of the circumferential-direction grooves 11 made in the front surface of the tread part 2. In a case where the thickness of the rubber in this region is less than 0.5 mm, it is difficult for the tire tube to ensure high durability while satisfactorily exerting the shock absorbing function because the rubber is too thin. On the contrary, in a case where the thickness is more than 2 mm, it is not desirable because the mass of the tire tube is too large. Here, it is described that the thickness t of the rubber layer as the outermost layer is set not less than 0.5 mm but not more than 2 mm in the portion corresponding to the region W between the outermost circumferential-direction grooves in the tire tread part when the tire tube is set in the tire. This means that the thickness t of the rubber layer as the outermost layer is not less than 0.5 mm but not more than 2 mm in the entire region W, and does not mean that an average thereof is.

As described above, the rubber component of the rubber layer is desirably a rubber composition in which at least butyl rubber having good air impermeability is blended. Nevertheless, in the embodiment shown in FIG. 5 where the tire tube has the three-layer structure in which the thermoplastic resin layer 5 is placed as the intermediary layer while the rubber layers 4, 4' are respectively placed on the outer and inner sides of the thermoplastic resin layer 5, the outer rubber layer 4 and the inner rubber layer 4' may be formed in a way that: the outer rubber layer 4 is formed of normal rubber component and the inner rubber layer 4' is formed of rubber composition in which the butyl rubber is blended; or the outer rubber layer 4 is formed of rubber composition in which the butyl rubber is blended and the inner rubber layer 4' is formed of normal rubber component.

For the purpose of achieving high air impermeability, the thickness of the thermoplastic resin layer is set desirably in a range of 10 μm to 2 mm, more desirably in a range of 50 μm to 200 μm.

The durability of the tire tube according to the present invention can be enhanced more not only by making the tube main body with the above-described lamination structure, but by additionally configuring an area of a valve seat to which an air injection valve is attached, and a splice part of circumferential end portions of the tube main body, as described below.

Figure 6:
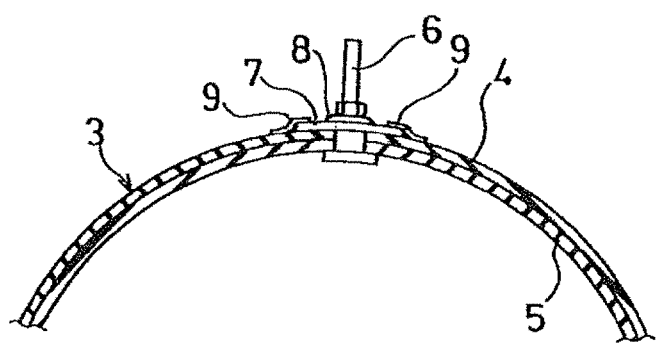
FIG. 6 is a main-part cross-sectional view showing a part in which an air injection valve of the tire tube according to the present invention is installed.

FIG. 6 shows a portion of the tire tube 3 to which the air injection valve 6 is attached.

A valve seat 7 is adhered to an external surface of the tube main body of the tire tube 3 at a position where the air injection valve 6 is attached. The air injection valve 6 is attached to the valve seat 7 with a metal valve seat fitting 8 in between. In this attachment structure, the valve seat 7 is made desirably of a thermoplastic resin or a thermoplastic elastomer composition obtained by blending an elastomer in a thermoplastic resin. Furthermore, the thickness of the valve seat 7 is desirably 0.1 times or more, more desirably 0.5 times or more as thick as that of the metal valve seat fitting 8. It is desirable that the upper limit of the thickness of the valve seat 7 should be approximately double the thickness of the metal valve seat fitting 8 for the purpose of preventing increase in the mass of the valve seat 7. Specifically, the desirable thickness of the valve seat 7 is set in a range of 200 μm to 2 mm.

In addition to the configuration of the valve seat, it is more desirable that a protective cover 9 made of the thermoplastic resin or the thermoplastic elastomer composition obtained by blending an elastomer in a thermoplastic resin is adhered to a joint section between the tube main body and the valve seat 7 of the tire tube 3 to cover the joint section in a way that the protective cover 9 stretches over both surfaces of the tube main body and the valve seat 7 of the tire tube 3. The shape of the protective cover 9 is generally a flat circular ring, but is not limited thereto.

The thermoplastic resin or the thermoplastic elastomer composition obtained by blending the elastomer in the thermoplastic resin, which is used as the material of the valve seat and the protective cover described above, can prevent the occurrence of cracks in a boundary area between the tube main body and the valve seat, because the breaking strength of the thermoplastic resin and the thermoplastic elastomer composition is larger than that of the rubber.

Figure 7:
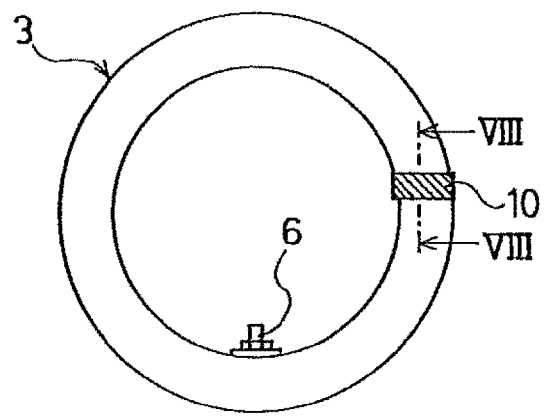
FIG. 7 is a tube schematic front view showing the tire tube according to the present invention as a model.
Figure 8:
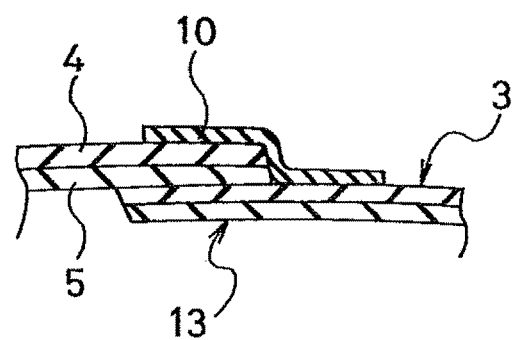
FIG. 8 is a cross-sectional view of the VIII-VIII line of FIG. 7 seen from a direction of the arrows.

FIG. 7 and FIG. 8 show a splice part 13 in which the circumferential end portions of the tube main body are overlappingly joined together. A protective cover 10 made of a thermoplastic resin or a thermoplastic elastomer composition obtained by blending an elastomer in a thermoplastic resin is adhered to this splice part 13 to cover the splice part 13. Here, the protective cover 10 stretches over the surfaces of the two end portions of the tube main body.

It is desirable that the protective cover 10 should be made as a belt-shaped body with a width of 5 mm to 10 mm, and with a thickness of not more than 0.5 mm. The lower limit of the thickness thereof is set desirably at approximately 10 µm for the purpose of effectively using the breaking strength. A more desirable range of the thickness thereof should be 50 µm to 200 µm. The protective cover 10 adhered to the splice part 13 of the tube main body can contribute to the prevention of cracks in the splice part, because the protective cover 10 has higher breaking strength than that of the rubber.

The following advantages can be obtained when a composition similar to the thermoplastic resin or the thermoplastic elastomer composition obtained by blending an elastomer in a thermoplastic resin, from which the tube main body is made, is used to make the valve seat 7 and the protective covers 9, 10. The occurrence of cracks in the tire tube is prevented in a well-balanced manner in the contact surface between the tire tube and the tire main body, in the molded splice part of the tube main body, and in the joint section between the tube valve seat and the tube main body. This ensures higher durability for the tire tube as a whole, and achieves a tire tube which exhibits excellent air impermeability.

EXPLANATION OF REFERENCE NUMERALS 1 pneumatic tire
2 tread part
3 tube
4 outermost layer (rubber layer)
4' innermost layer
5 thermoplastic resin layer
6 air injection valve
7 valve seat
8 metal valve seat fitting
9 protective cover
10 protective cover
11 circumferential-direction groove
12 rim
13 splice part of tube main body
W region between circumferential-direction grooves respectively situated in two outer portions of tire tread part
t thickness of rubber layer as outermost layer in region between circumferential-direction grooves respectively situated in two outer portions of tire tread part

What is claimed is:

1. A tire tube comprising:
    a tube main body having a multilayer structure including at least one rubber layer and at least one thermoplastic resin layer laminated together, the at least one thermoplastic resin layer being made of any one of a thermoplastic resin and a thermoplastic elastomer composition obtained by blending an elastomer in a thermoplastic resin; and
    an air injection valve attached to a valve seat adhered to an external surface of the tube main body with a metal valve seat fitting in between, the valve seat being made of any one of a thermoplastic resin and a thermoplastic elastomer composition obtained by blending an elastomer in a thermoplastic resin;
    wherein one said rubber layer is placed as an outermost layer of the multilayer structure in at least a region where the tube main body is configured to be in contact with an inner circumferential surface of a tread part of a tire when the tube is set in the tire;
    wherein one said thermoplastic resin layer is placed inside the outermost layer; and
    wherein a protective cover made of any one of a thermoplastic resin and a thermoplastic elastomer composition obtained by blending an elastomer in a thermoplastic resin is adhered to a joint section between the tube main body and the valve seat to cover the joint section in a way that the protective cover stretches over surfaces respectively of the tube main body and the valve seat.

2. The tire tube according to claim 1, wherein in a transverse cross section of the tube main body, the at least one rubber layer and the at least one thermoplastic resin layer are each formed in the shape of a ring continuing in a circumferential direction.

3. The tire tube according to claim 1, wherein the multilayer structure includes three layers including the rubber layer placed as the outermost layer superposed on an outer side of the one said thermoplastic resin layer and another rubber layer superposed on an inner side of the one said thermoplastic resin layer.

4. The tire tube according to claim 1, wherein the rubber layer placed as the outermost layer is made of a rubber composition in which at least butyl rubber is blended.

5. The tire tube according to claim 1, wherein the tube main body has a multilayer structure with three or more layers laminated together, including the rubber layer placed as the outermost layer and another rubber layer and the one said thermoplastic resin layer.

6. The tire tube according to claim 1, wherein the valve seat has a substantially constant thickness in a range of 200 µm to 2 mm, and the metal valve seat fitting is disposed in engagement with the valve seat.

7. The tire tube according to claim 1, wherein a thickness of the one said rubber layer as the outermost layer is set not less than 0.5 mm but not more than 2 mm in a portion thereof which corresponds to a region extending in a tire width direction between two outermost circumferential-direction grooves in the tire tread part when the tire tube is set in a tire.

8. The tire tube according to claim 1, wherein one of said at least one rubber layer and at least one thermoplastic resin layer is provided only in a portion of the tire tube which corresponds to a region extending in a tire width direction between two outermost circumferential-direction grooves in a tire tread part when the tire tube is set in a tire.

9. The tire tube according to claim 1, wherein another protective cover made of any one of a thermoplastic resin and a thermoplastic elastomer composition obtained by blending an elastomer in a thermoplastic resin is adhered to an outer peripheral portion of a splice part, where two end portions of the tire tube are overlappingly joined together, to cover the splice part in a way that the protective cover stretches over surfaces of the respective two end portions.

10. The tire tube according to claim 9, wherein the protective cover adhered to the outer peripheral portion of the splice part is a belt-shaped body with a width of 5 mm to 10 mm and a thickness of not more than 0.5 mm.

11. A tire tube comprising:
a tube main body having a multilayer structure including at least one rubber layer and at least one thermoplastic resin layer laminated together, the at least one thermoplastic resin layer being made of any one of a thermoplastic resin and a thermoplastic elastomer composition obtained by blending an elastomer in a thermoplastic resin; and
an air injection valve attached to a valve seat adhered to an external surface of the tube main body with a metal valve seat fitting in between, the valve seat being made of any one of a thermoplastic resin and a thermoplastic elastomer composition obtained by blending an elastomer in a thermoplastic resin;
wherein one said rubber layer is placed as an outermost layer of the multilayer structure in at least a region where the tube main body is configured to be in contact with an inner circumferential surface of a tread part of a tire when the tube is set in the tire;
wherein one said thermoplastic resin layer is placed inside the outermost layer; and
wherein a protective cover made of any one of a thermoplastic resin and a thermoplastic elastomer composition obtained by blending an elastomer in a thermoplastic resin is adhered to an outer peripheral portion of a splice part, where two end portions of the tire tube are overlappingly joined together, to cover the splice part in a way that the protective cover stretches over surfaces of the respective two end portions.

12. The tire tube according to claim 11, wherein the protective cover is a belt-shaped body with a width of 5 mm to 10 mm and a thickness of not more than 0.5 mm.

13. A tire tube comprising:
a tube main body having a multilayer structure including at least one rubber layer and at least one thermoplastic resin layer laminated together, the at least one thermoplastic resin layer being made of any one of a thermoplastic resin and a thermoplastic elastomer composition obtained by blending an elastomer in a thermoplastic resin; and
an air injection valve attached to a valve seat adhered to an external surface of the tube main body with a metal valve seat fitting in between, the valve seat being made of any one of a thermoplastic resin and a thermoplastic elastomer composition obtained by blending an elastomer in a thermoplastic resin;
wherein one said rubber layer is placed as an outermost layer of the multilayer structure in at least a region where the tube main body is configured to be in contact with an inner circumferential surface of a tread part of a tire when the tube is set in the tire;
wherein one said thermoplastic resin layer is placed inside the outermost layer; and
wherein the one said rubber layer placed as an outermost layer of the multilayer structure has a thickness which changes in the circumferential direction of the tire tube such that the thickness of the one said rubber layer becomes larger toward a region where the one said rubber layer comes in contact with an inner periphery of a tire tread part when the tire tube is set in a tire.

* * * * *